US011993963B2

(12) United States Patent
Inan et al.

(10) Patent No.: US 11,993,963 B2
(45) Date of Patent: May 28, 2024

(54) LATCH FOR A MOTOR VEHICLE IN PARTICULAR AN ELECTRICALLY OPERABLE MOTOR VEHICLE LOCK

(71) Applicant: Kiekert AG, Heiligenhaus (DE)

(72) Inventors: Ömer Inan, Dorsten (DE); Holger Schiffer, Meerbusch (DE); Michael Scholz, Essen (DE); Peter Szegeny, Engelskirchen (DE)

(73) Assignee: Kiekert AG, Heiligenhaus (DE)

( * ) Notice: Subject to any disclaimer, the term of this patent is extended or adjusted under 35 U.S.C. 154(b) by 222 days.

(21) Appl. No.: 17/286,514

(22) PCT Filed: Oct. 18, 2019

(86) PCT No.: PCT/DE2019/100912
§ 371 (c)(1),
(2) Date: Apr. 19, 2021

(87) PCT Pub. No.: WO2020/083439
PCT Pub. Date: Apr. 30, 2020

(65) Prior Publication Data

US 2021/0355717 A1 Nov. 18, 2021

(30) Foreign Application Priority Data

Oct. 22, 2018 (DE) ..................... 10 2018 126 165.9

(51) Int. Cl.
*E05B 77/36* (2014.01)
*E05B 81/04* (2014.01)
(Continued)

(52) U.S. Cl.
CPC .............. *E05B 81/16* (2013.01); *E05B 77/36* (2013.01); *E05B 81/04* (2013.01); *E05B 85/243* (2013.01); *E05B 85/26* (2013.01)

(58) Field of Classification Search
CPC ........ E05B 85/20; E05B 85/24; E05B 85/243; E05B 85/26; E05B 77/36; E05B 77/48;
(Continued)

(56) References Cited

U.S. PATENT DOCUMENTS 4,569,544 A * 2/1986 Escaravage ............ E05B 85/26 292/201
4,588,217 A * 5/1986 Escaravage ............ E05B 81/14 292/216
(Continued)

FOREIGN PATENT DOCUMENTS

DE 102005035898 A1 * 2/2007 ............ E05B 85/26
DE 102007024564 A1 11/2008
(Continued)

OTHER PUBLICATIONS

Computer Generated Translation for DE 102005035898, Generated on Feb. 21, 2023, https://worldwide.espacenet.com/ (Year: 2023).*
(Continued)

*Primary Examiner* — Alyson M Merlino
(74) *Attorney, Agent, or Firm* — Renner, Otto, Boisselle & Sklar, LLP

(57) ABSTRACT

A latch for a motor vehicle, in particular an electrically operable latch, comprising a locking mechanism having a catch and at least one pawl, it being possible to ratchet the catch in at least one main ratchet position by means of the pawl, and a further ratchet element located between the catch and the pawl in the engagement region and arranged on the catch, the ratchet element being pivotably accommodated in the catch.

18 Claims, 2 Drawing Sheets

(51) Int. Cl.
*E05B 81/16* (2014.01)
*E05B 85/24* (2014.01)
*E05B 85/26* (2014.01)

(58) Field of Classification Search
CPC .... E05B 77/38; E05B 77/40; Y10T 292/1047; Y10T 292/1082; Y10S 292/23
See application file for complete search history.

(56) References Cited

U.S. PATENT DOCUMENTS

| | | | | | |
|---|---|---|---|---|---|
| 5,092,639 | A * | 3/1992 | Di Giusto | E05B 85/26 | 292/216 |
| 10,294,700 | B2 | 5/2019 | Scholz et al. | | |
| 10,865,589 | B2 * | 12/2020 | Pettengill | E05B 81/15 | |
| 2001/0010427 | A1 * | 8/2001 | Roos | E05B 81/14 | 292/201 |
| 2011/0169280 | A1 * | 7/2011 | Scholz | E05B 85/26 | 292/200 |
| 2014/0091581 | A1 * | 4/2014 | Taurasi | E05B 77/36 | 292/215 |
| 2015/0315827 | A1 * | 11/2015 | Bendel | E05B 77/36 | 292/195 |
| 2018/0171681 | A1 * | 6/2018 | Hunt | E05B 81/40 | |
| 2021/0355722 | A1 * | 11/2021 | Inan | E05B 85/243 | |

FOREIGN PATENT DOCUMENTS

| | | | | |
|---|---|---|---|---|
| DE | 202008012086 | U1 | 1/2009 | |
| DE | 202008012707 | U1 * | 1/2009 | E05B 77/40 |
| DE | 202008012086 | U1 * | 2/2009 | E05B 85/26 |
| DE | 102007041477 | A1 | 3/2009 | |
| DE | 102009029023 | A1 | 3/2011 | |
| DE | 102009042061 | A1 * | 4/2011 | E05B 83/16 |
| DE | 102012024303 | A1 | 6/2014 | |
| DE | 102014006118 | A1 | 10/2015 | |
| DE | 102019123825 | A1 * | 3/2021 | E05B 77/40 |
| EP | 0406777 | A1 | 1/1991 | |
| EP | 1619329 | A1 * | 1/2006 | E05B 77/38 |
| EP | 2031164 | A2 | 3/2009 | |
| FR | 2472651 | A * | 7/1981 | E05B 17/007 |
| JP | 2016503473 | A | 2/2016 | |

OTHER PUBLICATIONS

Computer Generated Translation for FR 2472651 A, Generated on Jan. 4, 2024, https://worldwide.espacenet.com/ (Year: 2024).*

Translation of International Search Report issued Jan. 10, 2020, for International Patent Application No. PCT/DE2019/100912.

* cited by examiner

LATCH FOR A MOTOR VEHICLE IN PARTICULAR AN ELECTRICALLY OPERABLE MOTOR VEHICLE LOCK

This application is a national phase of International Application No. PCT/DE2019/100912 filed Oct. 18, 2019, which claims priority to German Application No. 10 2018 126 165.9 filed Oct. 22, 2018.

FIELD OF DISCLOSURE

The invention relates to a latch for a motor vehicle, in particular an electrically operable latch, comprising a locking mechanism having a catch and at least one pawl, it being possible to ratchet the catch in at least one main ratchet position by means of the pawl, and a further ratchet element located between the catch and the pawl in the engagement region and arranged on the catch.

BACKGROUND OF DISCLOSURE

The demands on modern motor vehicles and in particular the demands on comfort with regard to usability are constantly increasing. It is an aim of the automotive industry to provide easy-opening locking systems for doors, tailgates or hoods for the operator of the motor vehicle. The locking mechanism arranged in the vehicle latch has a decisive influence on the noise behavior and the haptics when a door or tailgate is opened.

A locking mechanism consists of a catch and a pawl, which can be moved into a ratcheted position in conjunction with a generally stationary latch holder. If, consequently, an open locking mechanism is moved in the direction of a latch holder, the catch moves into a locking position and is finally ratcheted in a locking or ratchet position by means of the pawl. There are locking mechanisms having one or two ratchet positions, i.e., a pre-ratchet position and a main ratchet position, and there are locking mechanisms that are equipped with one, two or more pawls in order to implement one or two ratchet positions in the locking mechanism. The acoustic behavior of the locking mechanism is significantly influenced by the engagement region between the catch and the pawl, with surface properties, forces and arrangements of the locking mechanism parts with respect to one another being able to influence the noise behavior.

To improve the noise behavior, a locking mechanism has become known from DE 10 2012 024 303 A1 in which components, known as puzzle blocks, are arranged in the engagement region between the catch and the pawl and can be made of different materials and/or can be provided with different surface structures. The components used in the locking parts can for example be made of a material that improves the tribological behavior of the friction partners and thus supports a noise reduction when the locking mechanism parts slide apart. In addition, it is disclosed that the alignment of surface grooves between the friction partners makes it possible to release the locking mechanism easily and with little noise.

Another locking system with a solution for easy opening of the locking mechanism is known from DE 10 2014 006 118 A1. In an exemplary embodiment, the document describes the arrangement of two pawls in engagement with the catch, the pawls differing by way of a structural arrangement with respect to the catch. In locking mechanisms, reference is also made to an opening or closing or neutral moment. In the case of a closing moment, the force vector introduced into the pawl by the catch causes the locking mechanism to be forced into a closed position. In contrast to this, in the case of a locking mechanism with an opening moment, a moment is generated that pushes the pawl out of the engagement region with the catch. The document discloses a solution which is intended to achieve easy and quiet opening of a locking mechanism. First, a closing pawl is moved out of the engagement region with the catch, as a result of which a pawl comes into engagement with the catch with an opening moment. The combined interaction of the pawls with the catch can provide a latch that opens quietly.

The solutions known from the state of the art for achieving a latch that is quiet or easy to open offer good approaches, but are in need of improvement. This is where the invention starts from.

SUMMARY OF DISCLOSURE

The object of the invention is to provide a latch that can be opened easily and quietly and a locking mechanism for a latch, so that safe, quiet and low-noise unlocking of the locking mechanism can be ensured even in extreme situations. This relates in particular to the fact that the locking mechanism and its properties are to be designed in such a way that the locking mechanism can also be unlatched at any time by means of an electric drive.

The object of the invention is to provide an improved latch, in particular an improved locking mechanism for a latch of a motor vehicle. In particular, the object of the invention is to provide a structurally favorable and inexpensive possibility for achieving a locking system that is easy to open and acts quietly.

The object is achieved by the features of the disclosure. Advantageous embodiments of the invention are specified in the disclosure. It should be noted that the exemplary embodiments described below are not limiting; rather, any variations of the features described in the description are possible.

The object of the invention is achieved in that a latch for a motor vehicle, in particular an electrically operable latch, is provided, comprising a locking mechanism having a catch and at least one pawl, it being possible to ratchet the catch in at least one main ratchet position by means of the pawl, and a further ratchet element located between the catch and the pawl in the engagement region and arranged on the catch, the ratchet element being pivotably accommodated in the catch. The design of the motor vehicle latch according to the invention now makes it possible to provide a structurally favorable locking mechanism by means of which the locking mechanism and thus the latch can be opened easily and quietly. In particular, the pivotable accommodation of the ratchet element in the catch allows a relative movement between the catch and the pawl without the locking mechanism parts disengaging. This relative movement makes it possible to reduce the load from the catch into the pawl and thus provide a favorable engagement ratio between the catch or ratchet element and the pawl.

During closing of the locking mechanism, the catch comes into engagement with a latch holder, the catch being moved into a ratchet position, for example a pre-ratchet position and a main ratchet position, through the relative movement of the latch holder and catch. It is also possible here for the catch to be moved into an overtravel position that goes beyond the main ratchet position, so that it is possible for the pawl to fall safely into the catch.

During this closing process, a door seal, for example, is compressed, creating a force that is transmitted to the locking mechanism via the latch holder. This closing force must be absorbed by the locking mechanism during operation of the motor vehicle. In extreme situations, such as an accident, extreme loads or forces can act on the locking mechanism. Even in these extreme situations, the locking mechanism must securely fix the latch holder. During opening of the locking mechanism, the above-mentioned forces act on the locking mechanism, with the ratchet element according to the invention on the catch relieving the locking mechanism by pivoting the locking mechanism parts to one another without the locking mechanism parts disengaging, as a result of which a peak load on the locking mechanism can be accommodated by the ratchet element arranged pivotably in the catch. The rotating or pivoting movement of the ratchet element thus has a relieving effect on the locking mechanism, so that there is less force between the locking mechanism components in a subsequent disengagement of the pawl and the ratchet element. This can achieve easier but also quieter unlatching of the locking mechanism.

When reference is made to a motor vehicle latch within the meaning of the invention, this includes motor vehicle latches which are used, for example, in side doors, sliding doors, tailgates, hoods and/or covers, where pivotably or slidably mounted components are arranged on the motor vehicle. It is also conceivable that the motor vehicle latch is arranged in a backrest of a seat or is used as a floor latch for a removable seat, to name just a few application examples.

The motor vehicle latch has a locking mechanism which has a catch and at least one pawl. Preferably, at least one pawl is arranged in one plane with the catch and is able, in cooperation with a latch holder, to lock the catch in one position. When the locking mechanism is open, an inlet mouth of the catch points toward a latch holder, the catch pivoting as a result of a relative movement between the latch holder and the catch. The pawl is usually preloaded toward the catch such that the pawl comes into engagement with the catch or the ratchet element upon reaching a ratchet position.

To unlock the locking mechanism, a release lever is used, the release lever interacting with the locking mechanism and preferably with the pawl in such a way that the locked locking mechanism can be unlocked by the movement of the release lever. The release lever is, for example, pivotably mounted in the motor vehicle latch and is able to move at least one pawl out of the engagement region with the catch. In this case, systems having one, two or even three pawls are used. For example, it is conceivable that the pre-ratchet position is provided with a separate pawl, the pawl interacting by means of a further pawl in the main ratchet position, the second pawl being held in engagement with the catch by means of a third pawl, which can also be referred to as a blocking or ratchet lever. In a preferred embodiment, the locking mechanism according to the invention has a pre-ratchet pawl, which is arranged in a parallel plane in the motor vehicle latch. The pre-ratchet pawl can be mounted on a pin of the main ratchet pawl, such that only one pin is to be provided for the pivotable mounting of the pre-ratchet pawl and the main ratchet pawl. The pre-ratchet pawl can preferably be brought into engagement with a contour or a bolt on the catch in order to implement a pre-ratchet position of the locking mechanism.

In a design variant of the invention, a main ratchet position of the locking mechanism can be set by means of the ratchet element in cooperation with the pawl. The pivotable ratchet element is held between the catch and the pawl in such a way that the ratchet element rests securely in the main ratchet position between the pawl and the catch. The pivoting movement of the ratchet element can make it easier to unlock the locking mechanism, but at the same time it is possible to achieve a secure mounting of the ratchet element and/or the pawl in the locking mechanism through the interaction of the ratchet element and the pawl. By means of a targeted geometric or structural design of the ratchet element, a closing moment can act at least on the ratchet element. Closing then means that by the force acting in the locking mechanism, which is preferably introduced into the locking mechanism by the latch holder, the ratchet element is forced into the closed position.

It is also advantageous and represents an embodiment of the invention if a neutral moment in the locking mechanism can be adjusted in a main ratchet position. Easy opening of the locking mechanism can also be supported by a neutral design of the main ratchet position. In a neutral design of the locking mechanism, neither an opening nor a closing moment acts on the pawl. Of course, this is only possible in an ideal design; in real terms, a slightly closing moment results from the design of the tolerances. In contrast to a closing design of the locking mechanism, with the neutral design of the locking mechanism, it is not necessary to overcome the closing moment when opening the locking mechanism. It is thus possible to move the pawl easily by means of the release lever. In the neutral design, the structural arrangement of the ratchet element in the catch plays a crucial role, since the ratchet element transfers the load from the catch or the latch holder to the pawl. The ratchet element must be mounted in the catch in such a way that overall a neutral design of the locking mechanism results from the mounting point of the ratchet element and the engagement region between the ratchet element and the pawl.

In a design variant, the ratchet element can be guided in the latch by means of a casing for the catch and/or a latch housing and/or a latch case and/or a reinforcing plate. Overall, the ratchet element is pivotably mounted in the catch, so that a movement of the ratchet element directed in the direction of the catch plane or the locking mechanism plane can be made possible. The locking mechanism plane forms the main load direction when closing and holding the latch or, for example, the door during operation of the motor vehicle. But even in extreme situations it is necessary that the ratchet element can be securely held in engagement with the pawl. The casing of the catch can be used for this purpose, the catch preferably being encased with plastics material by means of an injection molding process. By extending the plastics casing beyond the catch body into the region of the ratchet element, the ratchet element can be guided at least in regions.

In order to be able to ensure adequate lateral guidance, i.e., perpendicularly to the locking mechanism plane, even in extreme situations, the ratchet element can also be guided laterally in the locking mechanism plane, for example by means of the latch housing or the latch case. Depending on the structural design of the motor vehicle latch, such as including a latch case and a reinforcing plate, it is also conceivable that the ratchet element can be guided between the latch case and a reinforcing plate. A reinforcing plate is used to support the locking-mechanism-part pins so that even the highest loads on the locking mechanism can be absorbed.

If the catch and/or a catch casing and/or a latch case forms a stop surface for the ratchet element, this results in a further design variant of the invention. The ratchet element is pivotably accommodated in the catch, such that it is easily possible to form a stop surface on the catch for the ratchet element. In this case, the abutment surface can be formed from the catch casing, so that the ratchet element can abut the catch quietly and in a dampable manner.

However, it is also conceivable that the ratchet element abuts the metal main body of the catch at least in regions. A stop surface for the ratchet element can also be provided, for example, by the latch case or a latch housing, depending on the installation space and structural conditions in the motor vehicle latch. A stop surface for the ratchet element serves to hold the ratchet element in the corresponding position or to limit pivoting of the ratchet element. In particular, in a main ratchet position of the locking mechanism, the contact surface can also serve as a support surface for the ratchet element and at the same time serve as a transmission surface for forces to be introduced into the pawl. In the sense of transmitting the forces to be absorbed by the catch, the ratchet element can also be referred to as a transmission lever.

Another design variant of the invention results when the ratchet element is held in the catch in an interlocking manner. An interlocking accommodation of the ratchet element or the transmission lever allows additional securing for holding and positioning the ratchet element in the catch. The pivotable arrangement of the ratchet element in the catch means that the ratchet element is held in the catch with a certain tolerance.

The interlocking accommodation and, in particular, an interlocking accommodation in the sense of a cooperating radius between the catch accommodation and the ratchet element can achieve a rolling or shifting of the ratchet element in the catch. The rolling or shifting movement of the ratchet element then makes it possible, on the one hand, to achieve a rolling movement in the engagement region between the pawl and the ratchet element during unlocking and, at the same time, for the ratchet element to roll itself in the catch. This can achieve secure releasing with the lowest possible noise emission. The ratchet element can be inserted into the catch in an interlocking manner, for example, before the catch is installed in the motor vehicle latch, so that a catch provided with the ratchet element pivotably accommodates the ratchet element and the other latch components guide the ratchet element in relation to the locking functions.

It can also be advantageous if, in a main ratchet position, the ratchet element abuts the catch with a maximum abutment surface. In the main ratchet position of the locking mechanism, extreme loads can occur in the locking mechanism and in particular in the engagement region between the ratchet element and the pawl. An extreme load can act on the motor vehicle as a result of an accident, for example, the locking mechanism having to securely hold the component that is movably arranged on the motor vehicle. Advantageously, if the ratchet element abuts an abutment surface and in the accommodating opening of the catch, a favorable force transmission between the catch and the pawl can be achieved. In addition to the mounting of the ratchet element in the catch, the abutment surface can then also serve for stabilization and force transmission in the locking mechanism. Advantageously, the ratchet element can come into engagement with an abutment surface on the catch, at least in regions, over its entire surface.

Another design variant results when the ratchet element is held in the catch at a pivot angle of 10 degrees to 60 degrees, preferably 20 to 50 degrees and even more preferably at a pivot angle of 25 to 45 degrees. The pivot angle range disclosed herein provides, on the one hand a sufficiently stable mounting for the ratchet element in the catch can be ensured and, on the other hand, sufficient mobility for the ratchet element can be provided to ensure that the pawl rolls into a region in which the pawl is out of engagement with the swivel range of the catch. The pivot angle can be limited by the catch itself and/or by stop surfaces in the motor vehicle latch and in particular on the latch case.

If the ratchet element and the pawl are each formed concentrically to the mounting points thereof in the engagement region thereof, so that a rolling movement between the ratchet element and the pawl is possible, this results in a further advantageous design variant of the invention. Concentric engagement surfaces on the pawl and the ratchet element allow rolling in the engagement region between the pawl and ratchet element. In combination with the pivotable mounting of the ratchet element in the catch and the pivotable mounting of the pawl in the motor vehicle latch, a rolling movement can be achieved in the engagement region. This makes it possible to release the locking mechanism quietly, but above all easily.

Another design variant can be achieved in that the pawl can be held in a main ratchet position by means of a blocking lever. Guiding the pawl or blocking the pawl in the main ratchet position is advantageous when the locking mechanism has an opening moment. In the case of an opening moment, a force acts on the pawl which would pivot the pawl out of the engagement region of the ratchet element. The blocking lever then serves to secure the position of the pawl. However, it is also conceivable that a blocking lever is provided in the case of a neutral or closing design of the locking mechanism in order to ensure that the pawl is securely fixed and positioned.

BRIEF DESCRIPTION OF DRAWINGS

The invention is explained in more detail in the following with reference to the attached drawings on the basis of a preferred exemplary embodiment. However, the principle applies that the exemplary embodiment does not limit the invention, but is merely an advantageous embodiment. The features shown can be implemented individually or in combination with further features of the description.

In the drawings.

DETAILED DESCRIPTION

Figure 1:
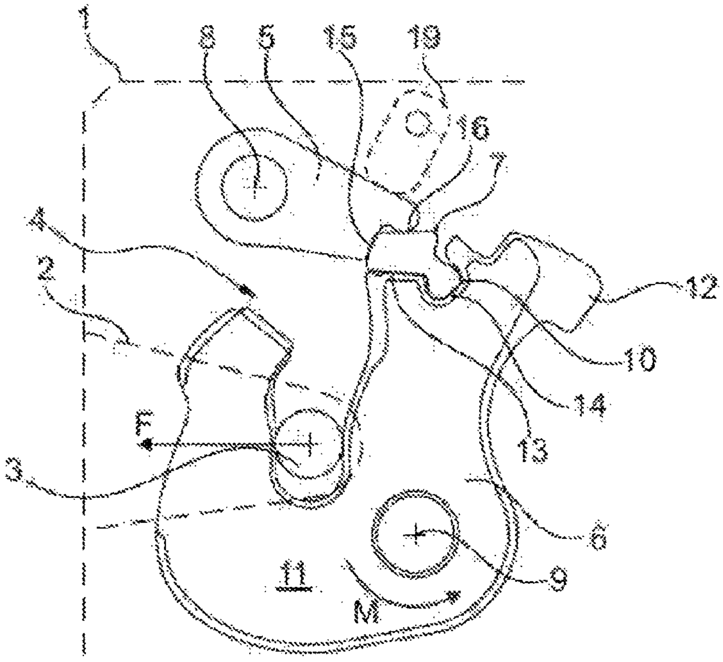
FIG. 1 is a basic illustration of a side view of a locking mechanism designed according to the invention in a main ratchet position in engagement with a latch holder.

In FIG. 1, a motor vehicle latch 1 is shown in a side view and in a basic illustration with the components essential for explaining the concept of the invention. The motor vehicle latch 1 has an inlet region 2 via which a latch holder 3 can be brought into engagement with the locking mechanism. The main ratchet position of the latch 1 is shown, in which the motor vehicle latch securely positions the component that is movably held on the motor vehicle. The locking mechanism 4, consisting of a pawl 5, a catch 6 and a ratchet element 7, serves to hold the latch holder 3. The pawl 5 is accommodated in the motor vehicle latch so as to be pivotable about a swivel pin 8 and the catch 6 is accommodated in the motor vehicle latch so as to be pivotable about a swivel pin 9. The ratchet element 7 is in turn pivotably held in a mounting point 10 of the catch 6. In this embodiment, the catch 6 has a metal core 11 which is provided with a plastics casing 12.

In this exemplary embodiment, the ratchet element 7 is accommodated in a mounting point 10 and in the plastics casing 12 of the catch 6. In this case, there is a first abutment surface 13 on which the ratchet element 7 abuts the surface of the catch, and a second abutment surface 14 which is formed in the mounting point 10 of the ratchet element 7. As can be clearly seen in FIG. 1, the latching element 7 abuts the catch 6 with a maximum abutment surface 13, 14. At the same time, however, the ratchet element 7 is pivotably accommodated in the catch 6. The abutment surface 13 also simultaneously forms a stop surface for the ratchet element, so that a pivoting movement of the ratchet element in the catch 6 can be limited.

In this embodiment there are two engagement regions 15, 16 between the pawl 5 and the ratchet element 7. Here, reference can be made to a primary engagement region 15 and a secondary engagement region 16. A main load direction, which, starting from the catch, is directed in the direction of the pawl swivel pin 8, lies in the primary engagement region 15 between the ratchet element 7 and the pawl 5. The secondary engagement region 16 is also used for power transmission, but can also serve to stabilize the position of the pawl 5, for example when the locking mechanism 4 has a closing moment.

A force F is introduced into the locking mechanism 4 by the latch holder 3 and in particular by the relative force acting on the latch holder 3 from, for example, a door seal. The force F generates a moment in the direction of the arrow M in the locking mechanism 4, which the pawl 5 counteracts. The force F or the moment M act as forces F, M between the ratchet element 7 and the pawl 5.

Figure 2:
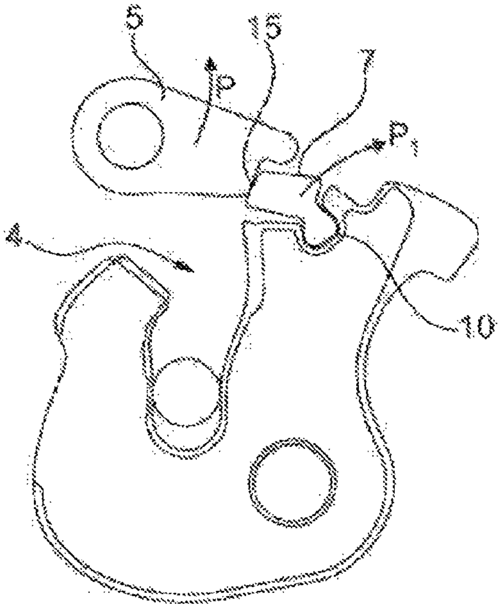
FIG. 2 shows the locking mechanism designed according to the invention in accordance with FIG. 1 when a releasing process has been initiated.

The position of the locking mechanism 4 is now shown in FIG. 2, by the pawl 5 being deflected counterclockwise in the direction of the arrow P by means of a release lever (not shown). The deflection of the pawl 5 in the direction of the arrow P causes the ratchet element 7 to detach itself from the secondary engagement region 16 and move clockwise in the direction of the arrow P1, the ratchet element 7 being pivoted in the mounting point 10 and at the same time in the primary engagement region 15 rolling on the pawl 5. There is consequently no hard unlocking of the locking mechanism in which the pawl 5 is shifted directly in the engagement region 15, 16 against the ratchet element 7, but instead the ratchet element 7 rolls or shifts on the pawl 5. This makes it possible to release the locking mechanism 4 quietly and above all easily.

Figure 3:
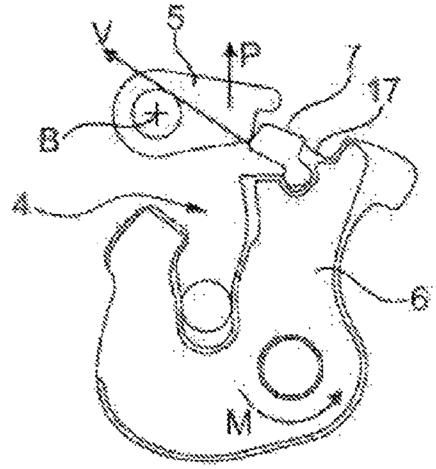
FIG. 3 shows a rolling movement of the ratchet element on the pawl during the opening process of the locking mechanism.

In FIG. 3, the pawl 5 was moved further in the direction of the arrow P around the swivel pin 8, as a result of which further rolling between the pawl 5 and the ratchet element 7 was produced. The further rolling of the ratchet element 7 on the pawl 5 has the consequence that the ratchet element 7 abuts a stop surface 17 on the catch 6. A force vector V as a resultant force from the moment M is directed in an opening direction of the pawl 5 at this unlocking stage, so that the locking mechanism 4 opens automatically. The ratchet element 7 now rests exclusively on an engagement region 15 of the pawl 5, so that the force vector V changes its orientation and generates an opening moment in relation to the pawl 5. As can be clearly seen in FIG. 4, the pawl 5 slips automatically from the ratchet element 7, but this is not associated with any haptic feedback for an operator of the motor vehicle, since the locking mechanism 4 opens automatically. It is thus possible to open the locking mechanism 4 easily and with little noise with respect to the rolling movement in the engagement region 15, 16 between the pawl 5 and the ratchet element 7.

Figure 4:
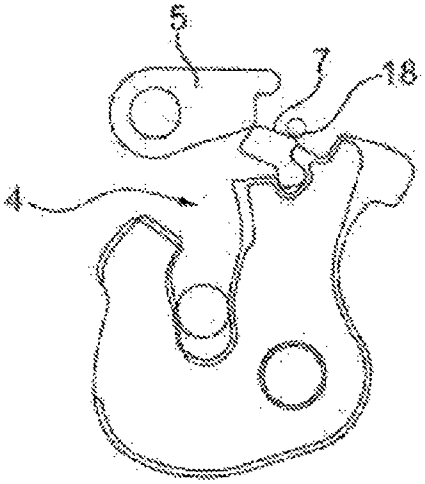
FIG. 4 shows the end of the rolling process between the ratchet element and the pawl shortly before the pawl is released such that the catch can move in an opening direction.

An external stop 18 is shown in FIG. 4 merely by way of example, in which case an abutment surface 17 on the catch 7 can of course be dispensed with. It is of course also conceivable, as shown as a dashed line in FIG. 1, that an additional blocking lever 19 interacts with the locking mechanism 4.

Figure 5:
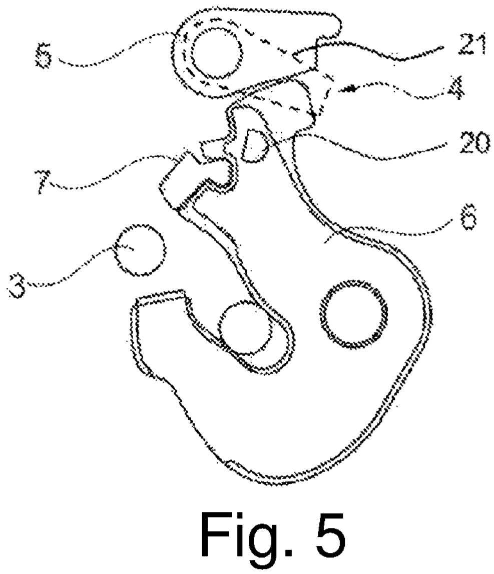
FIG. 5 shows the opened locking mechanism immediately after opening or at the beginning of a closing process of the latch.

The fully opened locking mechanism 4 is shown in FIG. 5, the latch holder 3 having disengaged from the catch 6 and the ratchet element 7 being moved back into its starting position. The ratchet element 7 can be spring-loaded or moved back into the starting position by means of a contour in the motor vehicle latch 1. The pawl 5 is preferably spring-loaded in the direction of the catch 6. Due to the design of the motor vehicle latch 1 according to the invention and in particular the use of a ratchet element pivotably accommodated in the catch 6, easy, low-noise and safe opening of the locking mechanism 4 can be achieved.

Alternatively, the locking mechanism 4 can also have a pre-ratchet. In FIG. 5, a pre-ratchet 20 is provided on the catch 6, a pre-ratchet pawl 21 being shown in dashed lines. The pre-ratchet 20 can be designed, for example, as a cylinder pin or bolt on the catch 6 and, merely by way of example, have a flat abutment surface for the pre-ratchet pawl 21. The pre-ratchet can of course also have a purely cylindrical design. In this embodiment, the pre-ratchet pawl 21 is arranged in a plane parallel to the pawl 5 in the motor vehicle latch 1 and is pivotable about the pin 8. The pawl 5 and the pre-ratchet pawl 21 consequently have a common pin 8, which reduces the number of components required to achieve a pre-ratchet and a main ratchet of the locking mechanism 4 to a minimum.

The pre-ratchet 20 can be mounted, for example, as a pre-ratchet bolt 20 in an opening of the catch 6. It is also conceivable that the pre-ratchet bolt 20 is passed through the catch 6 in order to achieve maximum stability and to facilitate mounting. The pre-ratchet 21 is designed as a steel part and can have a plastics casing, at least in regions, which can also be designed as a common plastics casing 12 with the catch 6.

A spring preload loads the pre-ratchet pawl 21 in the direction of the catch 6. Due to the parallel arrangement of the locking mechanism 4 and the pre-ratchet position 21, the locking mechanism 4 first moves, starting from the open position of the locking mechanism 4 shown in FIG. 5, into a pre-ratchet position during closing of the locking mechanism 4, the pre-ratchet pawl 21 engaging with the pre-ratchet 20.

LIST OF REFERENCE SIGNS

1 Motor vehicle latch
2 Inlet region
3 Latch holder
4 Locking mechanism
5 Pawl
6 Catch
7 Ratchet element
8, 9 Swivel pin
10 Mounting point
11 Metal core
12 Plastics casing

13, 14, 17 Abutment surface
15, 16 Engagement region
15 Primary engagement region
16 Secondary engagement region
18 Stop
19 Blocking lever
20 Pre-ratchet
21 Pre-ratchet pawl
F Force
M Moment
P, P1 Arrow
V Force vector

The invention claimed is:

1. A latch for a motor vehicle, the latch comprising:

a locking mechanism having a catch and a pawl configured to hold the catch in at least one main ratchet position; and a ratchet element that is arranged on the catch and located between the catch and the pawl in an engagement region, wherein the ratchet element is pivotably accommodated in a recess of the catch having a mounting point to pivot with respect to the catch to continue engaging the pawl to transfer a load from the catch to the pawl in an opening direction of the pawl as the catch rotates from the at least one main ratchet position toward an opened position, wherein the pawl and the catch rotate in a first direction as the catch rotates from the at least one main ratchet position toward the opened position, wherein the ratchet element pivots in a second direction because of the engagement with the catch and the pawl as the catch rotates from the at least one main ratchet position toward the opened position, wherein the second direction is opposite the first direction, wherein the ratchet element is configured to pivot about the mounting point of the catch, wherein the catch defines a first abutment surface against which the ratchet element abuts, and a second abutment surface formed in the recess having the mounting point for the ratchet element, wherein in the at least one main ratchet position, the ratchet element engages the first abutment surface and the second abutment surface, wherein the ratchet element disengages the first abutment surface while continuing engagement with the second abutment surface as the catch rotates in the first direction and the ratchet element pivots in the second direction.

2. The latch according to claim 1, wherein the at least one main ratchet position of the catch is configured to be set by the ratchet element and the pawl.

3. The latch according to claim 1, wherein the locking mechanism has a neutral moment when the catch is in the at least one main ratchet position.

4. The latch according to claim 1, wherein the ratchet element is guided in the latch by a casing of the catch.

5. The latch according to claim 4, wherein the catch forms a stop surface for the ratchet element.

6. The latch according to claim 1, wherein in the at least one main ratchet position, the ratchet element abuts the catch with a maximum abutment surface.

7. The latch according to claim 1, wherein the ratchet element is held in the catch at a pivot angle between 10 degrees and 60 degrees.

8. The latch according to claim 1, wherein the ratchet element and the pawl are formed concentrically with respect to respective mounting points in an engagement region between the ratchet element and the pawl to cause a rolling movement between the ratchet element and the pawl.

9. The latch according to claim 1, wherein the pawl is held in engagement with the catch by a blocking lever when the catch is in the at least one main ratchet position.

10. The latch according to claim 7, wherein the pivot angle is between 20 and 50 degrees.

11. The latch according to claim 10, wherein the pivot angle is between 25 and 45 degrees.

12. The latch according to claim 1, wherein the catch has a metal core and a plastic casing, wherein the recess having the mounting point for the ratchet element is formed in the plastic casing.

13. The latch according to claim 1, wherein the first abutment surface forms a stop surface for the ratchet element to limit a pivoting of the ratchet element with respect to the catch.

14. The latch according to claim 1, wherein the pawl and the ratchet element have two engagement regions therebetween, wherein the pawl is rotatable from a first position, in which the pawl is engaged with the ratchet element in both of the two engagement regions, to a second position, in which the pawl disengages from the ratchet element in one of the two engagement regions.

15. The latch according to claim 14, wherein the ratchet element is configured to simultaneously pivot about the mounting point on the catch and in one of the two engagement regions on the pawl.

16. The latch according to claim 1, wherein the ratchet element is configured to pivot in a direction that is parallel with a plane in which the catch is rotatable.

17. The latch according to claim 5, wherein the stop surface is formed on the catch and is configured to provide damping for the ratchet element.

18. The latch according to claim 14, wherein in the second position, rotation of the catch toward the opened position causes the ratchet element to exert a force vector on the pawl directed in the opening direction of the pawl.

* * * * *